(12) United States Patent
Gater et al.

(10) Patent No.: US 7,843,148 B2
(45) Date of Patent: Nov. 30, 2010

(54) DRIVING MULTIPLE PARALLEL LEDS WITH REDUCED POWER SUPPLY RIPPLE

(75) Inventors: Christian Gater, Dunblane (GB); Roel Van Ettinger, Bathgate (GB)

(73) Assignee: Micrel, Inc., San Jose, CA (US)

( * ) Notice: Subject to any disclaimer, the term of this patent is extended or adjusted under 35 U.S.C. 154(b) by 423 days.

(21) Appl. No.: 12/099,729

(22) Filed: Apr. 8, 2008

(65) Prior Publication Data

US 2009/0251071 A1 Oct. 8, 2009

(51) Int. Cl.
*H05B 37/02* (2006.01)
(52) U.S. Cl. .................. 315/291; 315/307
(58) Field of Classification Search .......... 315/185 R, 315/186–195, 209 R, 225, 226, 291, 307, 315/312, 361, 362
See application file for complete search history.

(56) References Cited

U.S. PATENT DOCUMENTS 6,812,776 B2 * 11/2004 Henry ................... 327/536
7,358,681 B2 * 4/2008 Robinson et al. ......... 315/224
7,609,237 B2 * 10/2009 Ragonesi et al. ......... 345/82

* cited by examiner

*Primary Examiner*—Douglas W Owens
*Assistant Examiner*—Jimmy T Vu
(74) *Attorney, Agent, or Firm*—Patent Law Group LLP; Brian D. Ogonowsky

(57) ABSTRACT

An LED driver is disclosed that drives LEDs connected in parallel. Instead of applying current to all the parallel-connected LEDs at the same time, under control of a common PWM brightness control signal, the application of current to each parallel path is staggered by using staggered brightness control signals. The turning on of the LEDs in the different parallel paths will have the same duty cycle but will be out of phase. This reduces ripple in the power supply by reducing the magnitude of the instantaneous current sink. In one embodiment, a shift register contains a binary representation of the PWM duty cycle, and a clock shifts the bits along the shift register. The PWM brightness control signals for each parallel path of LEDs are tapped from different positions along the shift register so that the PWM brightness control signals are identical but staggered.

22 Claims, 3 Drawing Sheets

DRIVING MULTIPLE PARALLEL LEDS WITH REDUCED POWER SUPPLY RIPPLE

FIELD OF THE INVENTION

This invention relates to a light emitting diode (LED) driver that drives LEDs in parallel.

BACKGROUND

LEDs are rapidly replacing incandescent bulbs, fluorescent bulbs, and other types of light sources due to their efficiency, small size, high reliability, and selectable color emission. A typical forward voltage drop for a high power LED is about 3-4 volts. The brightness of an LED is controlled by the current through the LED, which ranges from a few milliamps to an amp or more, depending on the type of LED. For this reason, LED drivers typically include some means to control the LED current.

In applications where high brightness is needed, multiple LEDs are used. It is common to connect LEDs in series, since the current through all the LEDs in series will be the same. However, driving many LEDs in series requires relatively high voltages, since the driving voltage must be greater than the combined voltage drops of the series LEDs. Additionally, when different types of LEDs are driven, such as different colors of LEDs, it may be desired to drive each type of LED with a different current. Therefore, in some applications, LEDs are connected in parallel, with the current through each parallel path being separately controlled. There may be only one LED in each parallel path, a few LEDs connected in series in each parallel path, or another configuration of LEDs in each parallel path. In some cases, one parallel path may drive a single red LED, another parallel path may drive two or more green LEDs connected in series, and another parallel path may drive one or more blue LEDs, in order to achieve a target overall brightness and color. Parallel LEDs may also be used for redundancy in case one LED fails and becomes an open circuit.

FIG. 1A is a typical prior art LED driver 10 that drives multiple LEDs 12 in parallel. Some parallel paths show multiple LEDs connected in series. Most components of the driver 10 are formed on an integrated circuit chip. The LEDs are typically connected to pins extending from the chip package.

A DC voltage regulator controller 14 up converts or down converts an input voltage (Vin), depending on the required voltage to drive the LEDs 12. Typically, the voltage regulator is a switching regulator operating at a high frequency, such as 100 KHz-5 MHz, to keep component sizes small. The controller 14 switches a switching transistor at a certain pulse-width modulation (PWM) duty cycle to maintain an output voltage (Vout) at the desired level. The switching transistor and an output circuit are represented by block 16. The output circuit comprises an inductor and diode (or synchronous rectifier) connected to the switching transistor to supply pulses of current to a smoothing capacitor 18. The topology of the output circuit determines whether the voltage regulator is a step up or step down regulator. Such regulators are well known and need not be described in detail.

The anodes of the "top" LEDs in each parallel path are connected to Vout, as shown in FIG. 1A, and the cathodes of the "bottom" LEDs in each path are connected to designated pins of the driver 10. The current through each path is individually set, such as by the user connecting a current set resistor to corresponding pins of the driver 10. Other types of current setting circuits may be used. A current setting circuit 20-22 for each parallel path is shown, where each circuit 20-22 may comprise a current set resistor or a current regulator. It is important to individually set the currents, since each parallel path may drive a different type (e.g., color) of LED that requires a different current to achieve the desired light output.

An LED's color is slightly dependent on the magnitude of the forward current. Once the current is fixed, it should be not changed in order to avoid color shift. Therefore, to adjust the perceived brightness of the LEDs 12, a PWM brightness control unit 24 outputs a PWM signal at a relatively low frequency (e.g., 100 Hz-1000 Hz) and effectively turns all the LEDs on and off at the LF PWM duty cycle. An externally generated dimming control signal sets the LF PWM duty cycle. For example, if the duty cycle were 50%, the average current would be half of the peak current when the LEDs are on. Thus, the perceived brightness of the LEDs would be about half the brightness of the LEDs when fully on.

FIG. 1B illustrates one type of brightness control unit 24. An N-Bit counter 26 cyclically counts, such as a repeating 5-bit count from 0-31, at a rate set by a clock. The binary count is applied to preset count detectors 28 and 30. Detector 28 detects a count that begins the high state of the PWM cycle, such as the count 00000. Upon count 00000 being detected, the detector 28 outputs a pulse. Detector 30 detects a count that begins the low state of the PWM cycle, such as 01010. Upon count 01010 being detected, the detector 30 outputs a pulse. The outputs of the detectors 28 and 30 are connected to the set and reset inputs, respectively, of an RS flip flop 32. The output of the flip flop 32 is the PWM brightness control signal, where the duty cycle in the example is approximately 30%.

The frequency of the LF PWM signal must be high enough to prevent noticeable flicker of the LEDs. There may be thousands of HF PWM pulses generated by the voltage regulator during each pulse (on-time) of the LF PWM signal. In this way, the current through the LEDs is either a "fixed" peak current or zero current. This keeps the emitted color of the LEDs constant, but enables the perceived brightness to be adjusted by the LF PWM duty cycle.

Since there are multiple parallel sets of LEDs, the combined currents of the paths can be high. For example, some LEDs may be driven at 1 Amp. When the brightness control PWM signal goes high, the voltage regulator must instantaneously supply driving current to all the LEDs at the same time. The large instantaneous change in the current causes a voltage ripple in the battery or other power supply. Greatly increasing the value of the smoothing capacitor 18 to smooth out the current drain on the power supply is not desirable, since such high value capacitors are relatively large and expensive. The ripple in the power supply due to the high currents being switched on and off causes noise that affects other circuits connected to the power supply. Since the PWM brightness control signal is at audio frequencies, the noise may even be audible.

What is needed is an LED driver that produces less ripple and noise compared to the conventional LED drivers.

SUMMARY

An LED driver is disclosed that drives LEDs connected in parallel paths. Each parallel path may include one LED, or LEDs connected in series, or LEDs connected in parallel, or LEDs connected in a combination of series and parallel.

Instead of applying current to all the parallel-paths at the same time, under control of a PWM brightness control signal, the application of current to each parallel path is staggered.

This reduces ripple in the power supply, since the current provided by the power supply when the PWM signal goes high is not the sum of all the LED peak currents. In fact, at medium and low duty cycles, the currents can be staggered such that all the LEDs are never on at the same time.

One way of doing this is to circulate a binary representation of the PWM duty cycle, such as 11111000 (duty cycle=62.5%), in an 8-bit shift register. Any number of bits (e.g., 128) can be used to more finely control the duty cycle. The bits (11111000) are initially loaded into the shift register, such as by a parallel loading process, and the bits are shifted through the shift register by a clock. The bit shifted out of the last position in the shift register is fed back into the first position, so the bit pattern recirculates through the shift register. The PWM brightness control signals for each parallel path of LEDs are tapped from different positions along the shift register so that the PWM brightness control signals are identical but staggered. The spacing of the taps may be equal, random or shaped, depending on the number of parallel paths and the current drawn by each path. The spacing should be that required to minimize ripple in the power supply. In one example, if the duty cycle is low enough, no high state PWM signal overlaps another high state PWM signal.

In another embodiment, the PWM brightness control signal is continuously and serially read into the shift register at one end, and the bits are shifted through the shift register. The PWM brightness control signals for each parallel path of LEDs are tapped from different positions along the shift register so that the PWM brightness control signals are identical but staggered. In this embodiment, there is no feeding back of any bits in the shift register, and the shift register acts as a clocked tapped delay line.

Other circuits may be used to create the staggered PWM signals.

Although embodiments of the invention have been summarized above, the scope of the invention is defined by the claims.

BRIEF DESCRIPTION OF THE DRAWINGS

Elements that are the same or equivalent in the figures are identified with the same numeral.

DETAILED DESCRIPTION

The present invention is an LED driver that staggers PWM brightness control signals to different parallel paths. The LEDs in each path are switched on and off in accordance with the PWM duty cycle to create a certain perceived brightness level, but the paths are energized at different times. This results in the current sinks being spread out so that there is less ripple produced by the power supply. This reduces noise, eases the constraints on the power supply, improves the color output of the LEDs, reduces artifacts caused by lights flickering, and provides other benefits.

Fig, 2A illustrates an N-Bit shift register 40. The number of bits determines the fineness in selecting PWM brightness control signal duty cycles. In one embodiment, the duty cycle of the LEDs is set by a 7-bit word, which represents 128 possible duty cycles (approximately 0.8% change in brightness per step). This would require a 128 bit shift register. Any size bit word may be used in the invention, such as 2-12 bits. For simplicity, only a 3-bit duty cycle word will be used in the examples, corresponding to 8 possible duty cycles (including 0%), or a 12.5% brightness change per step.

A simple digital converter (not shown) may be used to convert the 3-bit word into a pattern of 1's and 0's corresponding to the high and low states of the PWM signal. In the example used in the figures, a duty cycle of 62.5% is set by the 3-bit word (011), and the converter converts this code into the bit pattern 11111000, representing that the PWM brightness control signal is high for five bit-clock cycles and low for three bit-clock cycles.

Figure 1A:
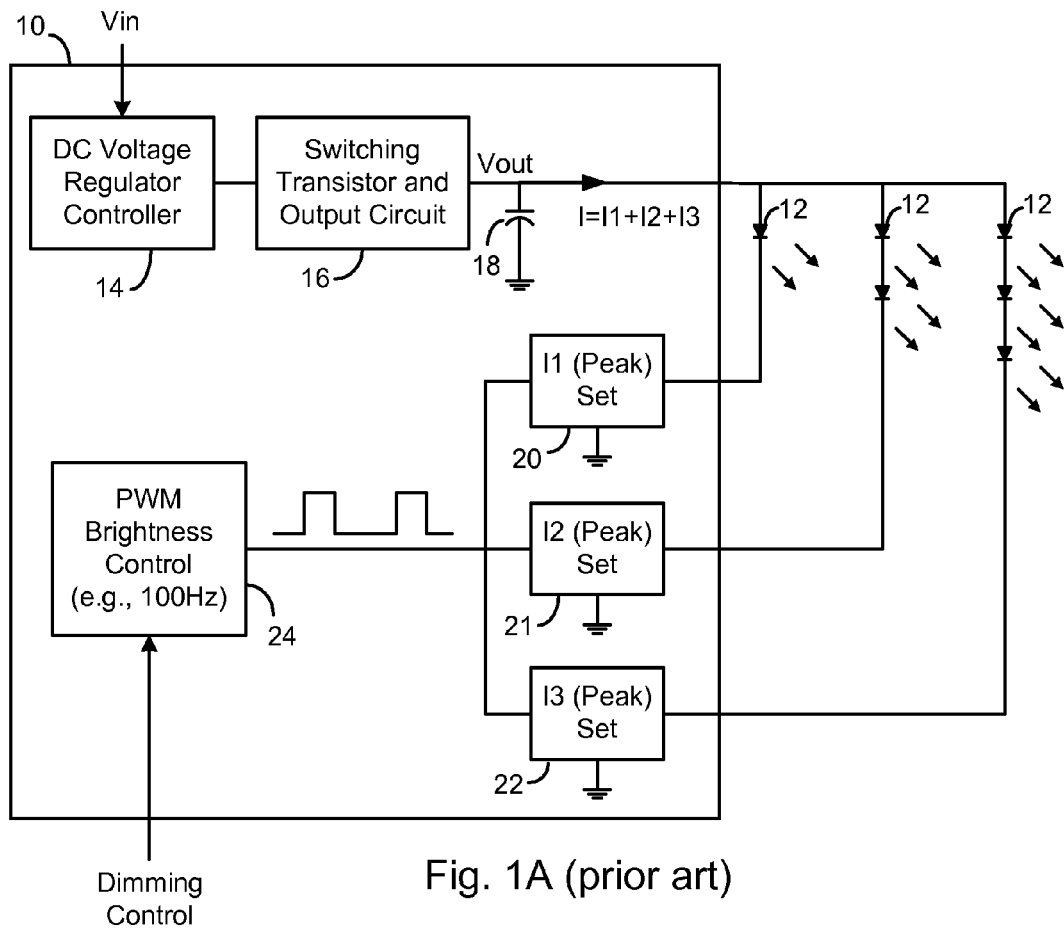
FIG. 1A illustrates a prior art LED driver, driving LEDs connected in different parallel paths.
Figure 1B:
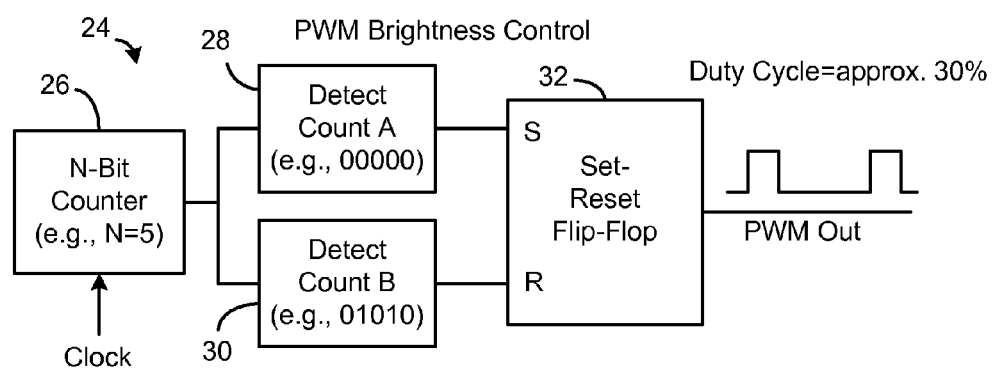
FIG. 1B illustrates a prior art PWM brightness control signal generator.
Figure 2A:
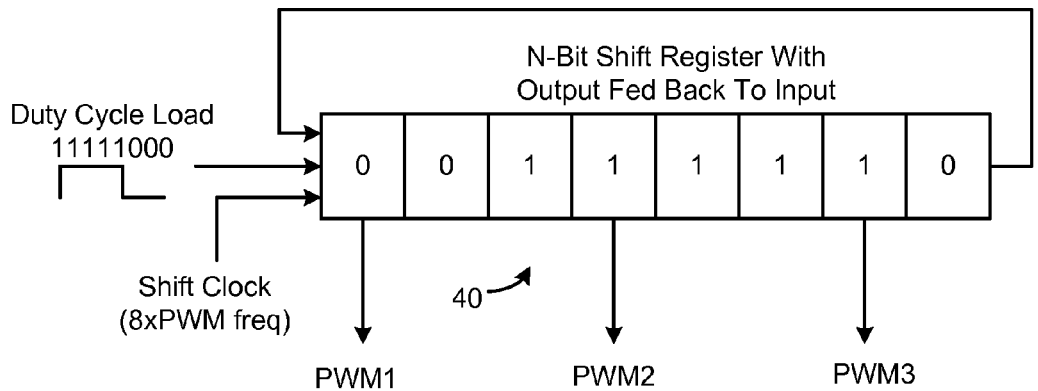
FIG. 2A illustrates a tapped recirculating shift register used to stagger PWM brightness control signals to the LEDs in the different parallel paths, in accordance with one embodiment of the invention.

In FIG. 2A, the 8-bit shift register 40 is loaded with the 11111000 bit pattern in parallel. In another embodiment, the bit pattern is shifted into the shift register 40 as a serial stream. A shift clock is applied to the shift clock terminal of the register 40 to shift the bit pattern to the right for every shift clock cycle. The shift clock has a frequency of 8× the PWM frequency. The PWM frequency should be above 100 Hz to avoid noticeable flicker in the LEDs. The bit shifted out of the last position in the shift register 40 is fed back into the first position, so the 8-bit pattern recirculates through the shift register 40.

The PWM brightness control signals for each parallel path of LEDs are tapped from different positions along the shift register 40 so that the PWM brightness control signals are identical but staggered. The spacing of the taps may be equal, random, or shaped, depending on the number of parallel paths and the current drawn by each path. The spacing and order of the taps should be that required to minimize ripple in the power supply. In the example shown, there are three taps outputting the staggered PWM signals: PWM1, PWM2, and PWM3. Each PWM signal will have the pattern 11111000, representing a 62.5% duty cycle. The taps may be in a different order, such as PWM1, PWM3, and PWM2.

Figure 2B:
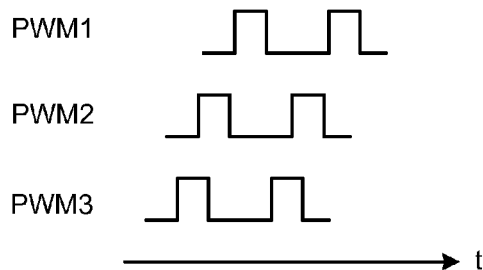
FIG. 2B illustrates the staggering of the PWM brightness control signals.

FIG. 2B shows the staggering of the three PWM signals, where the pattern is repeated as long as the bit clock continues to shift the bits in the register 40. In other words, the PWM signals are out of phase with each other. In one example, if the duty cycle is low enough, no high state PWM signal overlaps another high state PWM signal, so the maximum current supplied by the power supply is the highest current in any one LED path.

If the driver drives many parallel paths, some paths may be driven in phase and other paths driven out of phase.

As shown by the LED driver of FIG. 4, described in greater detail later, the staggered PWM signals are applied to their corresponding current set circuit for each parallel path.

Figure 3:
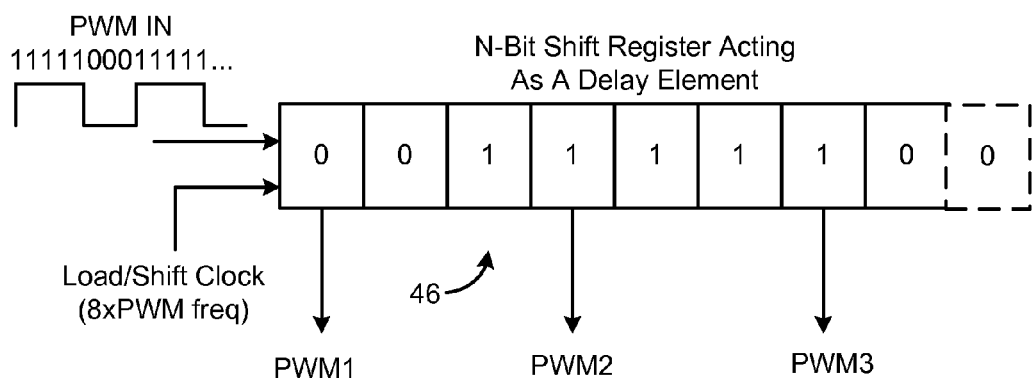
FIG. 3 illustrates a tapped non-recirculating shift register used to stagger PWM brightness control signals to the LEDs in the different parallel paths, in accordance with another embodiment of the invention.

In another embodiment, shown in FIG. 3, the bits of the PWM brightness control signal bit pattern 1111000 are continuously and serially loaded into the first bit position of the shift register 46 and then shifted by the load/shift clock. In this embodiment, there is no feeding back of any bits in the shift register, and the shift register acts as a clocked tapped delay line. The PWM brightness control signals (PWM1, PWM2, PWM3) for each parallel path of LEDs are tapped from different positions along the shift register 46 so that the PWM brightness control signals are identical but staggered, as shown in FIG. 2B.

Figure 4:
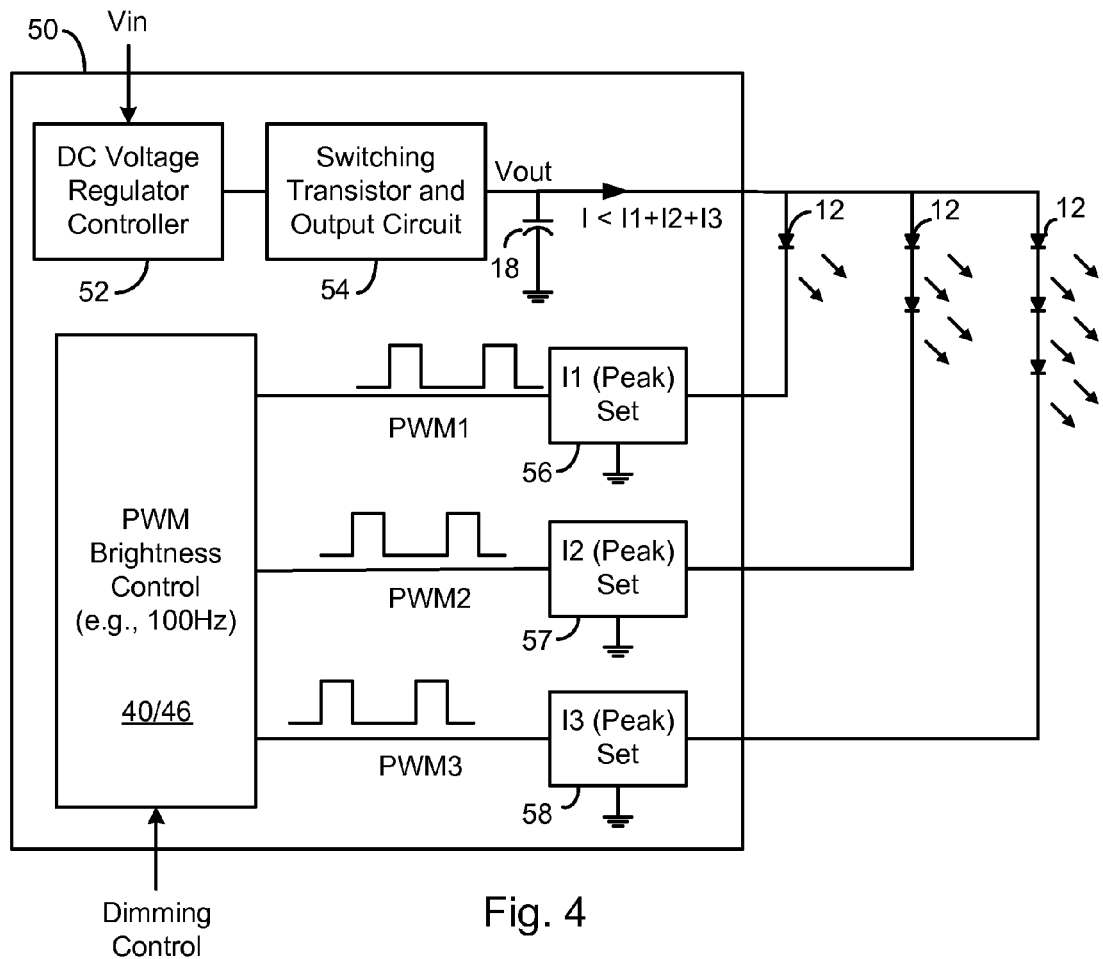
FIG. 4 illustrates an LED driver, driving LEDs connected in different parallel paths, using the staggered PWM brightness control signals, in accordance with one embodiment of the present invention.

FIG. 4 illustrates an LED driver 50. All circuitry, except for inductors, large capacitors, and the LEDs may be formed on the same integrated circuit. All elements shown in FIG. 4, except the LEDs, may be within the same package, with pins for connection to the LEDs, power, and an external dimming control circuit.

One or more LEDs 12 may be connected in each parallel current path. If more than one LED is to be driven by a single parallel path, such LEDs may be connected in series, parallel, or a combination to achieve the desired brightness and forward voltage drop for the path. There may be any number of parallel paths for driving LEDs, such as 2-10. Three paths are advantageous for controlling red, green, and blue LEDs to create a variety of colors.

The DC voltage regulator controller 52 may be a boost regulator controller, a buck regulator controller, or any other type of regulator controller needed to generate an output voltage (Vout) that exceeds the forward voltage drop for each parallel path of LEDs to turn the LEDs on. A conventional switching transistor and output circuit block 54 is shown. The voltage regulator controller 52 generates high frequency (e.g., 1 MHz) PWM signals that turn the switching transistor on and off, where the duty cycle controls the level of Vout. An inductor and diode (in block 54) connected to the switching transistor apply ramping currents to the smoothing capacitor 18, which supplies a relatively constant output voltage (Vout). The topology of the switching transistor, inductor, and diode contained in the block 54 determines whether the regulator is a step up or step down regulator. A step up regulator will typically be needed if many LEDs are connected in series. Examples of topologies for step up and step down regulators are found in Micrel's published data sheets for LED drivers and other products, and in U.S. Pat. No. 7,307,614, assigned to Micrel, all incorporated herein by reference. The regulator portion may also use isolated components, such as in a flyback or forward converter.

All LED paths are energized with the same voltage but may draw different currents, set by the current set circuits 56, 57, and 58. The current set circuits 56-58 are effectively enabled and disabled by their associated staggered PWM brightness control signal PWM1, PWM2, or PWM3. There may be any number of current set circuits, each driven by a staggered PWM signal. The PWM brightness control unit 40/46 may be either of the shift registers 40 or 46 in FIGS. 2A and 2B, or may be any other circuit that operates to stagger a PWM signal, such as a delay line.

Figure 5:
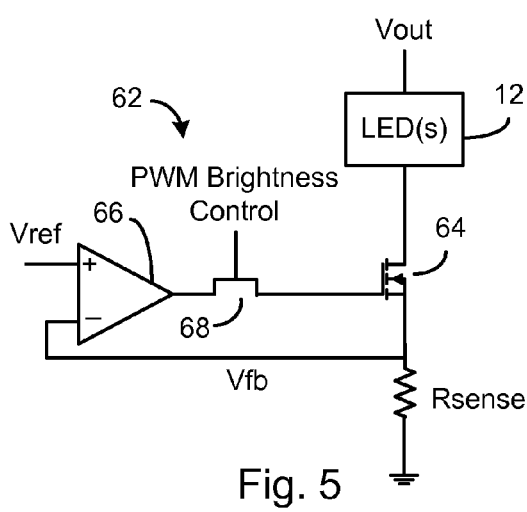
FIG. 5 illustrates one type of current regulator for a single parallel path receiving a staggered PWM brightness control signal.

FIG. 5 illustrates one current controller circuit 62 that may serve as each of the current set circuits 56-58 in FIG. 4. A low value sense resistor (Rsense) and MOSFET 64 are connected in series with the one or more LEDs 12 in a single parallel path of the driver 50. A feedback voltage (Vfb), proportional to the current through the LEDs, is applied to an inverting input of an op amp 66. The non-inverting input is coupled to a reference voltage (Vref). The op amp 66 controls the gate voltage of the MOSFET 64 to cause Vfb to equal Vref. The value of Rsense is selected to establish the peak current through the LEDs 12 when the MOSFET 64 is on. There may be a different Rsense value for each of the current set circuits 56-58 in FIG. 4. A pass transistor 68 is controlled to be on or off by the PWM brightness control signal. This turns the MOSFET 64 on at the PWM duty cycle. The transistors may be any type of suitable transistor.

Figure 6:
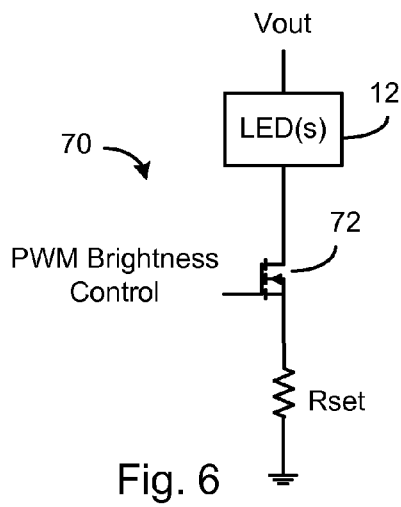
FIG. 6 illustrates one type of current set circuit for a single parallel path receiving a staggered PWM brightness control signal.

FIG. 6 illustrates another type of current set circuit 70 that may serve as each of the current set circuits 56-58 in FIG. 4. A current set resistor Rset and MOSFET 72 are connected in series with the one or more LEDs 12 in a single parallel path of the driver 50. Since Vout is substantially constant, the value of Rset is selected to establish the peak current through the LEDs 12. There may be a different Rset value for each of the current set circuits 56-58 in FIG. 4. The MOSFET 72 is controlled to be on or off by the PWM brightness control signal.

In addition to there being less power supply output voltage ripple by staggering the on-times of the different parallel paths of LEDs, there is less overall flickering of the light, since there is a shorter time (or even no time) that all the LEDs are off at the same time, compared to the prior art techniques. This is advantageous in certain situations and reduces eye fatigue.

The various components may be coupled together by direct wiring, or via resistors, or via buffers, or via level shifters, or via inverters, or via other components in order to properly operate.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A light emitting diode (LED) driver for driving LEDs connected to different parallel paths, the driver comprising:
   a voltage source for connection to first ends of LEDs in a plurality of parallel paths;
   a plurality of current set circuits, one current set circuit per parallel path, each current set circuit controlling a peak current through one or more LEDs connected in each parallel path; and
   a pulse-width modulated (PWM) brightness control signal generator connected to the plurality of current set circuits, the brightness control signal generator being configured to generate staggered PWM brightness control signals to the plurality of current set circuits,
   each current set circuit being configured to draw the peak current through its associated one or more LEDs at a duty cycle substantially corresponding to a duty cycle of a PWM brightness control signal applied to it, such that the plurality of current set circuits conduct current through their associated one or more LEDs at the same duty cycle but out of phase with each other.

2. The driver of claim 1 wherein the voltage source is a step up voltage regulator.

3. The driver of claim 1 wherein each current set circuit is a current regulator.

4. The driver of claim 1 wherein each current set circuit is a current regulator comprising:
   a current control transistor in series with one or more LEDs in an associated parallel path; and
   a feedback circuit connected to detect a current through the parallel path and connected to the current control transistor to control a conductivity of the current control transistor to cause the current through the parallel path to match a reference level.

5. The driver of claim 4 wherein each current set circuit further comprises a PWM brightness control transistor connected between an output of the feedback circuit and a control terminal of the current control transistor, the PWM brightness control transistor being connected to the PWM brightness control signal generator for receiving a staggered PWM brightness control signal to couple the output of the feedback circuit to the control terminal of the current control transistor at a duty cycle of the staggered PWM brightness control signal.

6. The driver of claim 1 wherein each current set circuit comprises:
   a current set resistor in series with one or more LEDs in an associated parallel path; and
   a PWM brightness control transistor connected in series between the current set resistor and the one or more LEDs in an associated parallel path, the PWM brightness control transistor being connected to the PWM brightness control signal generator for receiving a staggered PWM brightness control signal.

7. The driver of claim 1 wherein the PWM brightness control signal generator comprises:
   a shift register storing bits corresponding to a PWM duty cycle of a brightness control signal, the shift register having bit positions;
   a clock connected to the shift register for shifting the bits along the shift register; and
   taps off the shift register coupled to different bit positions of the shift register, each tap providing a different staggered PWM brightness control signal connected to an associated current set circuit.

8. The driver of claim 7 wherein the shift register has a connection that connects an end bit position to a first bit position so that bits in the shift register are recirculated in the shift register.

9. The driver of claim 7 wherein the bits corresponding to a PWM duty cycle of a brightness control signal are serially and continuously loaded into a first bit position of the shift register, then shifted by the clock.

10. The driver of claim 7 wherein the clock shifts the bits at a rate equal to N times a frequency of the PWM brightness control signal, where N equals the number of bits representing a single PWM duty cycle.

11. The driver of claim 1 wherein the plurality of parallel paths comprises at least three paths.

12. The driver of claim 1 further comprising the LEDs connected to the driver.

13. The driver of claim 1 wherein the driver is formed as an integrated circuit.

14. A method for driving light emitting diodes (LEDs) connected to different parallel paths, the method comprising:
   supplying a voltage to first ends of LEDs in a plurality of parallel paths;
   setting a peak current through one or more LEDs connected in each of the parallel paths, the peak current being set by a current set circuit for each parallel path;
   generating staggered pulse width modulated (PWM) brightness control signals;
   applying a different staggered PWM brightness control signals to each current set circuit; and
   drawing the peak current through the one or more LEDs in each parallel path, set by its associated current set circuit, at a duty cycle corresponding to a duty cycle of an associated PWM brightness control signal, such that the parallel paths of LEDs conduct current at substantially the same duty cycle but out of phase with each other.

15. The method of claim 14 further comprising varying the duty cycle of the staggered PWM brightness control signals to change an average current through the parallel paths of LEDs to change a perceived brightness of the LEDs.

16. The method of claim 14 wherein setting a peak current through one or more LEDs connected in each of the parallel paths comprises setting the peak current by controlling conductivity of a current control transistor in series with each parallel path, and wherein applying a different staggered PWM brightness control signal to each current set circuit comprises:
   coupling each staggered PWM brightness control signal to a control terminal of an associated pass transistor, each pass transistor being connected between a control terminal of a respective current control transistor and a regulating control voltage, such that the current control transistor is turned on and off corresponding to a duty cycle of the associated pass transistor.

17. The method of claim 14 wherein applying a different staggered PWM brightness control signal to each current set circuit comprises applying each staggered PWM brightness control signals to an associated transistor connected in series with the one or more LEDs in an associated parallel path, such that the transistor is turned on and off corresponding to the duty cycle of the staggered PWM brightness control signal applied to it.

18. The method of claim 14 wherein generating staggered PWM brightness control signals comprises:
   storing bits corresponding to a PWM duty cycle of a brightness control signal in a shift register, the shift register having bit positions;
   shifting the bits along the shift register under control of a clock; and
   receiving bits tapped off the shift register at different bit positions of the shift register to generate a different staggered PWM brightness control signal from the bits at each of the different bit positions.

19. The method of claim 18 further comprising recirculating bits in the shift register by feeding a bit at an output bit position to an input bit position along the shift register.

20. The method of claim 18 further comprising serially and continuously loading bits corresponding to a PWM duty cycle of a brightness control signal into a first bit position the shift register, then shifting the bits by the clock.

21. The method of claim 18 wherein the clock shifts the bits at a rate equal to N times a frequency of the PWM brightness control signal, where N equals the number of bits representing single PWM duty cycle.

22. The method of claim 14 wherein the plurality of parallel paths comprises at least three paths.

* * * * *